United States Patent [19]

Arendt et al.

[11] Patent Number: 5,408,924
[45] Date of Patent: Apr. 25, 1995

[54] APPARATUS FOR THE EXTRACTION OF EDIBLE OILS

[75] Inventors: Phillip S. Arendt, Chaska, Minn.; Charles E. Langley, Jennings, La.

[73] Assignee: Food Sciences, Inc., Jennings, La.

[21] Appl. No.: 19,978

[22] Filed: Feb. 19, 1993

Related U.S. Application Data

[63] Continuation-in-part of Ser. No. 12,118, Feb. 1, 1993, which is a continuation-in-part of Ser. No. 901,350, Jun. 19, 1992.

[51] Int. Cl.$^6$ ............................................. B01D 11/02
[52] U.S. Cl. ................................... 99/516; 99/495; 99/534; 99/443 C; 422/268
[58] Field of Search ............... 99/516, 534, 495, 496, 99/443 C, 473, 477, 478; 422/267, 268, 292; 196/14.52

[56] References Cited

U.S. PATENT DOCUMENTS

| | | | |
|---|---|---|---|
| 2,448,729 | 9/1948 | Ozai-Durrani | 99/80 |
| 2,629,029 | 2/1953 | Raphael . | |
| 2,727,914 | 12/1955 | Gastrock et al. | 260/412.4 |
| 2,733,136 | 1/1956 | Andrews | 422/268 |
| 2,829,055 | 4/1958 | Ozai-Durrani | 99/80 |
| 3,261,690 | 7/1966 | Wayne | 99/80 |
| 3,271,160 | 9/1966 | Kopas et al. | 99/21 |
| 3,524,029 | 8/1970 | Laff . | |
| 3,774,049 | 11/1973 | Coleman . | |
| 3,857,416 | 2/1975 | Barnes | 260/412.8 |
| 4,063,110 | 12/1977 | Glick . | |
| 4,183,292 | 1/1980 | Banks | 99/516 |
| 4,213,941 | 7/1980 | Boomer | 99/516 |
| 4,221,764 | 9/1980 | Saxon | 422/268 |
| 4,353,837 | 10/1982 | Barns | 260/412.4 |
| 4,479,688 | 10/1984 | Jennings . | |
| 4,647,735 | 3/1987 | Sicher . | |
| 4,808,426 | 2/1989 | Strop et al. | 426/417 |
| 4,857,279 | 8/1989 | Kawamata et al. | 99/516 |
| 5,035,910 | 7/1992 | Jones et al. | 426/476 |
| 5,047,254 | 9/1991 | Lee | 426/417 |
| 5,193,665 | 3/1993 | Jankow . | |
| 5,209,940 | 5/1993 | Champagne et al. | 426/320 |

FOREIGN PATENT DOCUMENTS

| | | |
|---|---|---|
| 2022725 | 8/1970 | France . |
| 2278397 | 2/1976 | France . |
| WO9117985 | 11/1991 | WIPO . |

OTHER PUBLICATIONS

Abstract of Japanese Publication No. JP62186757, Published Aug. 15, 1987.
Abstract of Soviet Union Publication No. 302359, Published week 10, 1972.
Abstract of Soviet Union Publication No. 988,860, dated Jan. 15, 1983.
Abstract of Soviet Union Publication No. 973,602, dated Nov. 15, 1982.

Primary Examiner—David A. Scherbel
Assistant Examiner—Reginald L. Alexander
Attorney, Agent, or Firm—Conley, Ross & Tayon

[57] ABSTRACT

Apparatus for extraction of edible oils from finely divided oleagenous vegetable matter by flowing solvent vapor through a continuously moving horizontal bed of the vegetable matter at a temperature not greater than about 210° F., to form a miscella of solvent and extracted oil, separating a portion of the miscella from the marc, and blowing a gas through a continuously moving horizontal bed of the marc and remaining miscella to separate additional miscella. The flow of gas through the bed cools the bed to provide cooling for heat exchanger water to be used in the process.

5 Claims, 8 Drawing Sheets ature, which is a continuation-in-part of application Ser. No. 08/012,118 pending, filed Feb. 1, 1993, entitled Method and Apparatus for the Extraction of Oils from Grain Materials and Grain-Based Food Products, which is a continuation-in-part of application Ser. No. 07/901,350 pending, filed Jun. 9, 1992.

APPARATUS FOR THE EXTRACTION OF EDIBLE OILS

RELATED APPLICATIONS

This application is a continuation-in-part of application Ser. No. 08/012,118 pending, filed Feb. 1, 1993, entitled Method and Apparatus for the Extraction of Oils from Grain Materials and Grain-Based Food Products, which is a continuation-in-part of application Ser. No. 07/901,350 pending, filed Jun. 9, 1992.

FIELD OF THE INVENTION

This invention pertains to a process and apparatus for the extraction of edible oils from oleagenous vegetable matter, such as rice bran, wheat mill feed, Canola®, rapeseed, amaranth, corn, peanuts and soy beans, as well as crushed or flaked vegetable matter and vegetable oil-containing food products which are somewhat porous, such as chips, noodles and crackers.

BACKGROUND OF THE INVENTION

It is known that the best and easiest oilseed to process is soy bean. Canola® and rapeseed have also been processed on the kind of equipment used to process soy bean; however, they have been ground, cooked, and rolled into flakes to provide an extractable material. Generally Canola® flakes can be run only at a much slower rate than soy beans. The resultant rapeseed and Canola® residual material after oil removal, called "marc", cannot readily be used for animal feeding due to the presence of trypsin inhibitors, high euric acid and high glucosinolates.

The process and apparatus of the present invention can be used to process oil seeds such as soy bean and safflower; however, the apparatus is particularly beneficial in obtaining oil from granular sources such as rice bran, wheat mill feed, Canola®, rapeseed in general, and amaranth (as well as similar grains), which have lower oil content than soy bean and safflower and, except for Canola, have not been economically competitive as an oil source prior to the present process. Typically, oil seeds contain from about 15 percent to about 40 percent by weight oil. Most of the grains of the kind described above contain only from about 4 percent to about 20 percent by weight oil. In addition to the lower oil content, the granular materials frequently require special processing in preparation for oil removal, and when a grain oil source such as rice bran is used, the rice bran itself has a limited shelf life before the oils begin to degrade, due to particularly active enzymes present in the bran. Thus, there are particular handling requirements and processing requirements necessary to enable the use of such edible oil sources.

Edible oils are usually extracted from most oil seeds by soaking crushed or pulverized seeds in liquid hexane. Usually, the seeds are washed with hexane five to seven times to get the maximum recovery of oil. The amount of hexane required for such washing is quite high, up to 40 times the weight of oil recovered. The oil is then separated from the oil-hexane solution, or "miscella" by distillation, and the hexane solvent is recovered for recycle use in the separation process. The marc which remains after removal of the oil from the seeds is generally a powder and contains substantial amounts, up to about 40 percent, of hexane. The marc is then "dried" to recover the residual hexane. Recovery of the hexane from the miscella and from the marc are both energy intensive processes and require extensive capital equipment, and is particularly expensive because of the large amount of hexane required.

As previously discussed, Canola® and rapeseed in general have been processed on soy bean equipment; they have been ground, cooked and rolled into flakes prior to oil extraction. Even then, the process rate in oil seed processing equipment was marginally cost effective compared with soy bean. Other potential vegetable matter sources of oil include wheat mill feed, amaranth, and rice bran, for example. Wheat mill feed is the material removed from wheat during milling. Twenty percent or more of all the world's wheat ends up as mill feed. Most of this goes into pet food and animal feed. Amaranth, another potential source of oil, known in the midwest as "pig weed", grows wild. The amaranth cultivars are available to anyone through the U.S.D.A. Wheat mill feed and amaranth can both be extruded into a pellet because they contain sufficient amounts of starch and sugars. The pellets can be processed on standard soy bean equipment, but the hexane solvent typically used for extraction also extracts large quantities of green chlorophyll so that the oil is difficult to refine as well as being dark green, almost black in color.

Rice bran requires a particularly specialized process. The rice bran cannot easily be flaked or made into an extrudable pellet because of lack of starch and the presence of sucrose. Rice bran can be extruded if corn starch is added, but the sucrose can caramelize if heated in the presence of air, giving a dark hue to the oil product. Rice oil can be extracted with hexane using an extractor of the type used to process soy beans, but this process is comparatively slow, energy intensive and expensive when compared to soy beans. Moreover, the remaining rice bran flour still has substantial oil in it.

Examples of equipment and processes for extracting oil from vegetable matter include the following:

U.S. Pat. No. 4,353,837, to Roy W. Barns, issued Oct. 12, 1982, describes apparatus and method for extracting oil from pelletized grain material in which the grain pellets are fed into a liquid miscella of solvent and oils removed from the feed, and then passed downwardly in a column countercurrent to an upward flow of solvent vapor, with additional liquid solvent being added to the feed material near the bottom of the column.

U.S. Pat. No. 2,448,729, to A. K. Ozai-Durrani, issued Sep. 7, 1948, describes a method of extracting oil from rice bran and rice polish. The rice bran or polish or mixtures of the two is subjected to an agglomeration step immediately, or within a relatively short time interval, after the bran and polish have been removed from the rice grain. The natural sugars; starches and glutens of the rice bran are partially soluble in water and are used to aggregate the material into porous aggregates suitable for oil extraction processes. Typically the aggregate material is extruded into elongated relatively thin strips. The aggregated rice bran or polish in then extracted using a vegetable oil solvent, preferably hexane, under a reduced pressure or in the presence of an inert gas such as nitrogen or carbon dioxide, and at a maximum temperature of about 140° F. to avoid decomposition of the vitamin and food values of the material.

U.S. Pat. No. 2,727,914, to E. A. Gastrock et al., issued Dec. 20, 1955, describes the solvent extraction of rice bran to produce bran oil. In particular, the rice bran is subjected to a mild heat treatment to make the oil more easily extractable. The rice bran particles are cooked while controlling their moisture content so that, at least at an early stage, the particles contain between about 14% to 26% by weight moisture. The cooking temperature is increased from about 170° F. to about 235° F. in the final stage, at which time the moisture content has decreased to between about 6% to about 18%, by weight. The resulting bran particles are then exposed to a relatively cool atmosphere conducive to the evaporation of moisture until they undergo a substantially uniform decrease in temperatue to below about 130° F. and a moisture content ranging from about 2% to about 4%. The treated rice bran particles are then mixed with a solvent for rice bran oil and the resulting slurry is filtered to separate the rice bran particles from the miscella. Solvents recommended for extraction include commercial hexanes, methylpentanes and trichloroethylene.

U.S. Pat. No. 2,829,055, to A. K. Ozai-Durrani, issued Apr. 1, 1958, pertains to a method of treating rice paddy or hulled rice grains to remove the rice oils and fats from the bran and polish coatings of the rice. The process for removing the rice oil content of the bran coating on dehulled rice grains comprises immersing the whole grains in a solvent consisting of a low specific gravity petroleum fraction for a time interval at a temperature less than the boiling point of the solvent, to obtain extraction of the significant portion of the rice oil content of the bran coating. In another embodiment of the invention, the removal of the hulls from the rice paddy is accomplished as a sequence of the defatting treatment. The rice paddy is extracted with an organic solvent, and the majority of the solvent, containing oils, is removed. The solvent is removed by drainage, with residual solvent being removed from the rice grains either by vacuum distillation, or by heating the grains to a temperature above the boiling point of the solvent, or by exposing the grains to a current or blast of air. The solvent-containing paddy is then shocked by suddenly increasing the temperature by between about 10° C. and 50° C. to substantially the flash point of the solvent and then igniting the solvent with a flame or spark, to burn the hulls, which fall from the rice kernel, leaving the kernel intact and unbroken.

U.S. Pat. No. 3,261,690, to T. B. Wayne, issued Jul. 19, 1966, relates to improvements in the milling of rice and barley which greatly reduces the breakage of rice grains during the milling. In general, the bran is milled from brown rice in the presence of a solvent effective to extract fatty components from the rice and germ. The bran may be softened with a liquid bran-softening agent used in combination with a volatile organic solvent effective to extract fatty components from the bran and germ. Examples of softening agents include non-toxic oils such as highly refined mineral oils and edible vegetable oils, as well as naturally occurring or synthetic esters of glycerol, propylene glycol, polypropylene glycol or sorbitol with fatty acids. Among preferred extraction solvents are low boiling, highly refined petroleum fractions such as n-hexane and n-heptane. In addition, polar solvents such as alcohols and ethers may be used. Chlorinated hydrocarbons may also be used.

U.S. Pat. No. 3,271,160, to G. A. Kopas et al., issued Sep. 6, 1966, describes a process for preparing feed from undecorticated oil free safflower seed residue. The safflower seeds are crushed or otherwise broken open to get access to the oil inside them, which oil is solvent extracted using known techniques, preferably with hexane. The improvement provided by the invention is that the meat of the residual seed materials, after extraction, can be separated from the hulls by subjecting the relatively dry residual seeds to impact—either pneumatically or by shooting it in an air stream through a gun at a target or mechanically, as in a vertical or horizontal impact mill or similar device. Since the meat particles are fractured more than the hulls, a classification by size alone can be used to separate the products into markedly different protein content compositions.

U.S. Pat. No. 4,808,426, to Strop et al., issued Feb. 28, 1989, describes a process for extraction of vegetable oil from an oil bearing material such as soy bean, corn and the like. The process comprises adding at least one reagent and an oil, of preferably the same type as will be extracted from the oil bearing material, to the oil bearing material to form a slurry mixture. The reagent preferably comprises a reagent for cleaving the chemical bond of the non-hydratable phospholipids, thereby converting the non-hydratable phospholipids into hydratable phospholipids. Typically this reagent is an acid. The slurry is heated at a preselected temperature for a period of time, preferably under a partial vacuum. Subsequently, the resultant oil is extracted from the slurry mixture. This process reduces the phospholipid and trace metal content in the oil extracted from the oil bearing material.

U.S. Pat. No. 5,035,910, to J. D. Jones et al., issued Jul. 30, 1991, pertains to separation of oilseed components in solvent phase. In particular, oilseed, particularly whole Canola ® seed, is separated under non-oxidizing conditions, in a non-aqueous solvent system, into high quality oil and proteinaceous flour food components, and a seed coat meal (hull) byproduct. Maceration in a solvent, sequential liquid cyclone separations, and recovery of components and solvent all take place in completely enclosed liquid flow-through systems with solvent recycle, in a relatively short time. Flaking, cooking and pressing of the Canola ® seed is not required.

U.S. Pat. No. 5,047,254, to T-C Lee, issued Sep. 10, 1991, describes a process for the recovery of edible oil from cereal products. The oil content of rice bran is stabilized by simultaneous high temperature high pressure treatment. Such a treatment also improves the yield obtainable when such oil is extracted from rice bran by solvent extraction. The bran is pretreated prior to extraction of oil by subjecting the bran to 100° C. to 200° C. and at least 500 psi for from 5 to 20 seconds in the absence of added moisture. The pelletized product produced is then extracted using known solvent extraction methods.

Each of the above-described methods and apparatus for separating oil from vegetable matter has both advantages and disadvantages. The present invention provides a very economical method and apparatus for extracting oil from vegetable matter, providing cost advantages over currently utilized techniques. Oil is extracted in a fraction of the time required for previously used commercial methods, and to a substantially greater degree. By use of the process of the present invention, rice bran can be produced which has an oil content of less than two percent, and has no objectionable odor or taste, so that it is suitable for use in human food products. Further, the present invention results in the production of high quality oils at a cost substantially less than is possible with present commercial processes.

SUMMARY OF THE INVENTION

In accordance with the present invention, edible oils can be extracted from vegetable matter such as, for example, rice bran, wheat mill feed, Canola ® and rapeseed in general, and amaranth, in a manner which provides low temperature, low-energy-consumption processing conditions. Other oil producing vegetables, such as corn and peanuts, are also advantageously processed to extract oil by use of the apparatus and method of this invention. The apparatus and method of the present invention can also be applied to vegetable-based products wherein the product is in a flaked or thin strip form, such as chips, noodles, crackers and the like. All of such materials are intended to be included in the term "vegetable matter" in this description and the appended claims.

According to this invention oil is extracted from vegetable matter by contact with a vaporized solvent for the oil. Preferably, the solvent is vaporized by heating at or near atmospheric pressure, although it may also be vaporized under pressure or under a vacuum. Contact of the solvent vapor with the vegetable matter is provided by a differential pressure across a moving bed of the vegetable matter, and at a temperature that is not so high as to cause degradation of either the oil or the oil-depleted vegetable matter.

The vegetable matter from which oil is to be extracted is moved along a perforated conveyor belt while the vaporized extraction solvent is passed upwardly through the vegetable matter. Alternatively, the vaporized solvent may be passed downwardly through the horizontally moving bed of vegetable matter. Preferably, the vaporized solvent, along with some oil components extracted from the feed material, is carried upwardly by a vacuum source located above the feed material. A partial vacuum can be created using a flue, alone or in combination with a condenser.

Alternatively, the solvent vapor may be at a temperature and pressure high enough that it is forced through the bed of feed material. Conditions of operation may be chosen so that a substantial proportion, if not nearly all, of the oil is carried from the bed with the solvent.

When conditions are such that some of the liquid miscella formed by extracted oil and solvent remains in the bed of vegetable matter, some of it drains downwardly by gravity through the perforated belt and is collected for further treatment. A vacuum may be applied below this portion of the belt to increase the amount of miscella removed at this stage. A substantial proportion of the miscella typically remains on the surface of the vegetable matter. In a preferred embodiment of this invention, most of this miscella is separated from the remaining solid material, or marc, in a second pressure-tight housing, by causing a dry gas, such as air or nitrogen, to flow downwardly through a horizontally moving bed of the marc-miscella mixture carried on the same belt or a second perforated conveyor belt. The gas flow is produced by a pressure differential across the bed, provided by pressure above the bed, vacuum below it, or a combination of pressure and vacuum. The temperature and pressure differential are controlled so as to vaporize a portion of the miscella and to blow substantially all of the remaining miscella through the perforated belt. The vaporized miscella absorbs heat of vaporization so as to lower the temperature adjacent the bed sufficiently to provide a source of chilled water for use in heat exchangers in the process.

The extracted vegetable matter may be processed to remove residual solvent and or solvent/oil component using techniques known in the art such as rotary drum drying and vacuum assisted solvent removal techniques. The extracted vegetable matter typically is processed by exposure to vacuum alone or combined with heat, depending on the fragility of the product. The various oil/solvent compositions collected may be stored prior to further processing, or may be fed directly to an apparatus for separating heavier, principally higher molecular weight unsaturated oils from lighter, principally lower molecular weight saturated oils.

Vapor extraction of oil according to this invention is much faster than liquid hexane extraction, and requires only a fraction of the amount of solvent. The process operates at much lower temperatures than are common in hexane extraction, so that proteins are not denatured, and so that most of the water is not removed from the marc. Azeotropes are not formed with the solvent except when extreme conditions are used. The vegetable matter does not have to be cooked or mechanically prepared before processing. The energy requirements for the method are much less than for conventional extraction methods.

Not only are edible oils produced from the process of the present invention, but numerous products comprising the residual vegetable matter after oil extraction, are of special interest as valuable food and feed products.

The extracted oils generated from rice bran typically include about 20% by weight light oils, typically saturated fats and waxes, and about 80% by weight heavier oils, typically unsaturated fats and fatty acids. These light and heavier oil components can be separated by the process described in our previous patent applications identified herein as Related Applications.

DETAILED DESCRIPTION OF THE PREFERRED EMBODIMENTS

The following description is in terms of using the invention for the extraction of rice oil from rice bran, although the apparatus and method, with minor modifications dictated by characteristics of the particular material, have application to a wide range of oleagenous vegetable materials, including brans from other cereal grains, seed grains such as amaranth, rapeseed, Canola and soy beans, other oleagenous vegetables such as corn and peanuts, and vegetable products such as chips, noodles, crackers and the like. All such materials are included herein within the term "vegetable matter".

Rice bran and wheat mill feed can be extracted without previous treatment. Rice bran results from milling dehulled brown rice grains to abrade away the brown covering, producing polished white rice grains with the bran as a by-product consisting of small flaky particles. The rice bran, due to enzymatic action and its oil content, is highly susceptible to lipolytic rancidity within a few hours if it is not stabilized shortly after milling. To obtain oil which is low in off-flavors, it is therefore desirable to process the bran shortly after milling. When desirable, the rice bran can be stabilized from degradation and prepared for oil extraction by, for example, the method described in our U.S. patent applications Ser. No. 07/901,350, filed Jun. 19, 1992, and Ser. No. 08/012,118, filed Feb. 1, 1993, the disclosures of which are incorporated herein by reference. However, it is sometimes desirable to allow the enzymatic action to continue for a few days, if the products resulting from such action are desired.

Although oil can be extracted in accordance with this invention from rice bran and some other brans and chips without any preparatory processing, it will be necessary to prepare some of the vegetable materials, depending upon their oil content and particle size. Vegetable sources which contain a significant amount of oil, such as corn, rapeseed, flaxseed, soybeans, cottonseed, olives, cocoa and amaranth may be extracted after grinding or other pulverization which renders the oil content more accessible. Such vegetable sources which have been processed by mechanical pressing techniques, as is the long-standing practice, still contain a significant amount of oil, and more oil may be extracted from the remaining pulp by the present invention.

Figure 2:
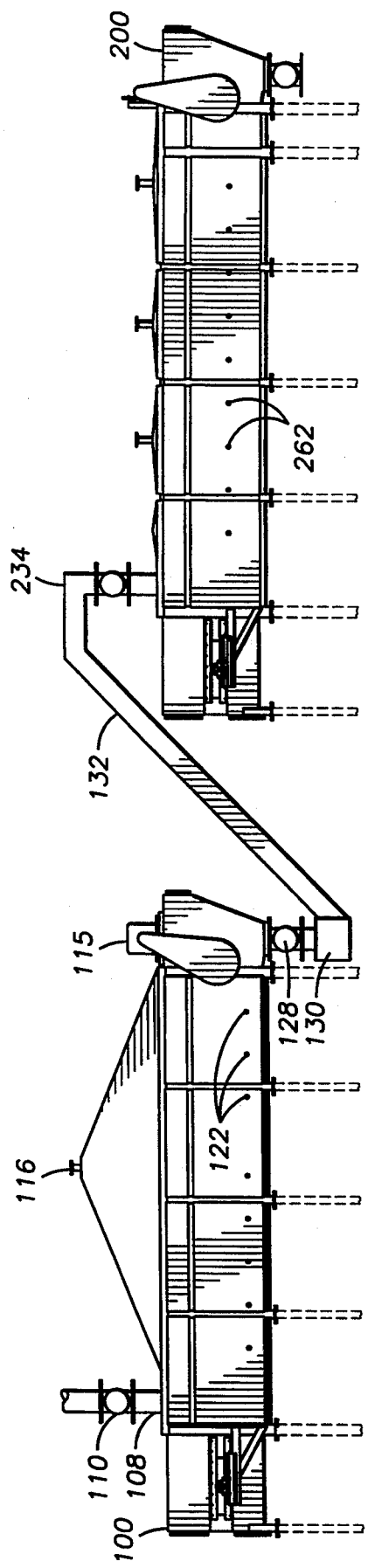
FIG. 2 shows a preferred embodiment of the oil extraction apparatus of this invention.

In a preferred embodiment of this invention, oil is separated from vegetable matter with a two-stage apparatus, as illustrated in FIG. 2 of the drawing. The apparatus shown consists of a first vapor contact extractor 100 and a second oil removal apparatus 200, although both operations could be carried out in a single unit. The extractor 100 is an elongate horizontally extending pressure-tight container, shown mounted on legs 101. An air lock 110 is provided in inlet conduit 108 of the extractor 100, from which the vegetable matter enters the extractor. The vegetable matter may be introduced without preheating, at ambient temperature, although in some applications it may be desirable to preheat it. From inlet conduit 108, the vegetable matter is substantially continuously deposited onto a moving, porous conveyor belt 112 (FIG. 4), and is spread to a substantially uniform depth by a plow 111. The conveyor belt 112 is moved substantially horizontally at a preselected speed, being driven by a drive pulley 113, which in turn is driven by a motor 115, and carried over an idler pulley 117 at the opposite end of the extractor.

Figure 4:
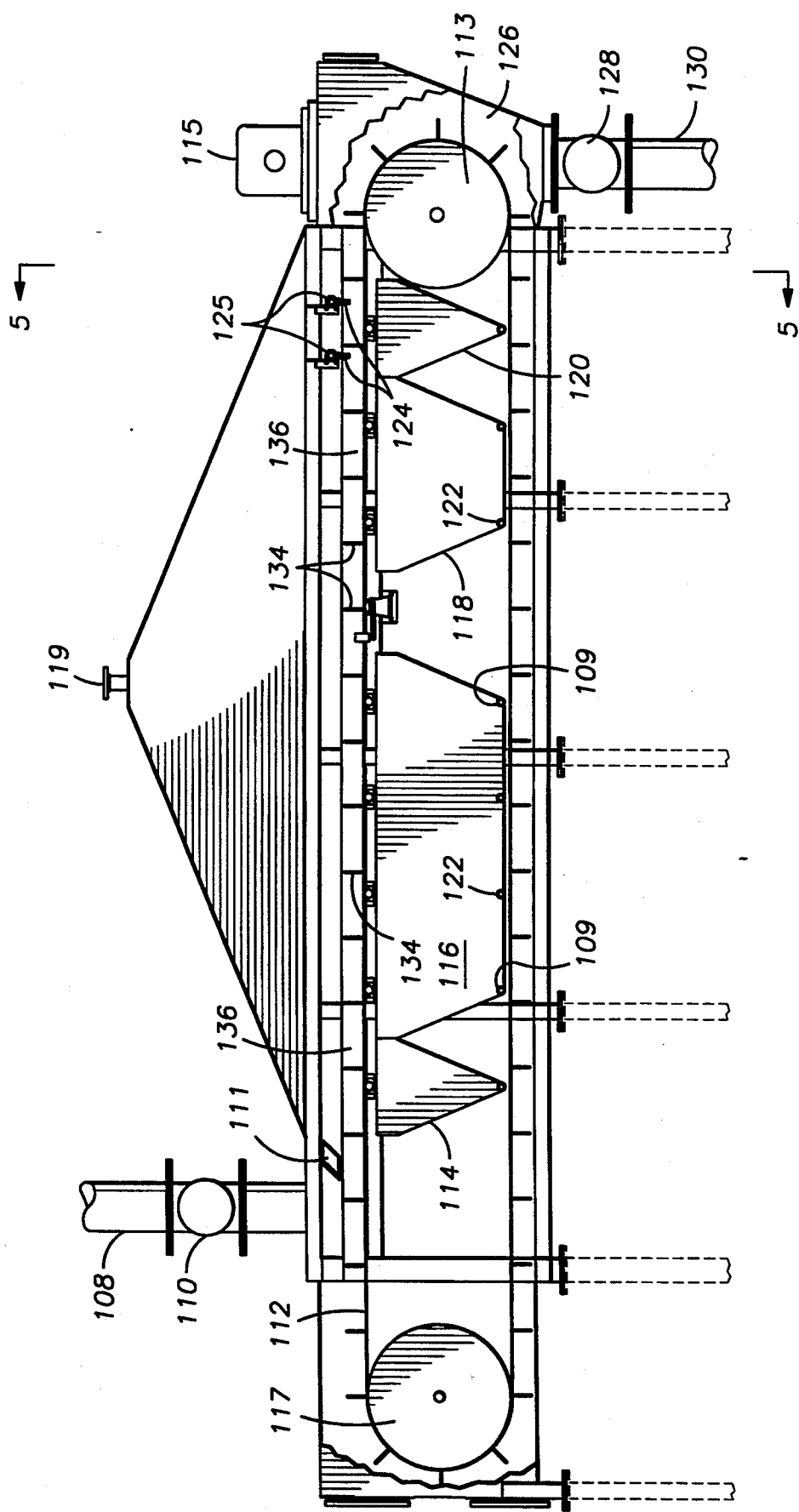
FIG. 4 is a vertical longitudinal sectional view of the apparatus shown in FIG. 3.

Referring to FIG. 4, the depth of the grain bed on the conveyor belt 112 in the extractor may be from 3 to 10 inches, but is preferably 4 to 8 inches for rice bran. A depth of 6 to 7 inches has been found to work best for rice bran. Greater or lesser depths are less efficient, resulting in lower production rates or requiring an unnecessarily long conveyor belt to insure efficient extraction of oil and waxes. Different vegetable matter will require different depths for maximum efficiency, depending on the porosity of the bed and the rate of extraction of the oil from the vegetable matter. The most desirable depth of vegetable matter can be determined by trial and error with minimal experimentation. The porosity of the belt must be such as to allow flow of vapor through it, preferably without significantly restricting the flow of the vaporized solvent, while allowing no more than a minor amount of the vegetable matter to fall through. For rice bran, an 60 to 120 mesh, preferably about 80 mesh, polyethylene belt has been found to give good results. In some applications, a porous membrane, rather than a perforated belt, may allow sufficient flow of the solvent.

Figure 5:
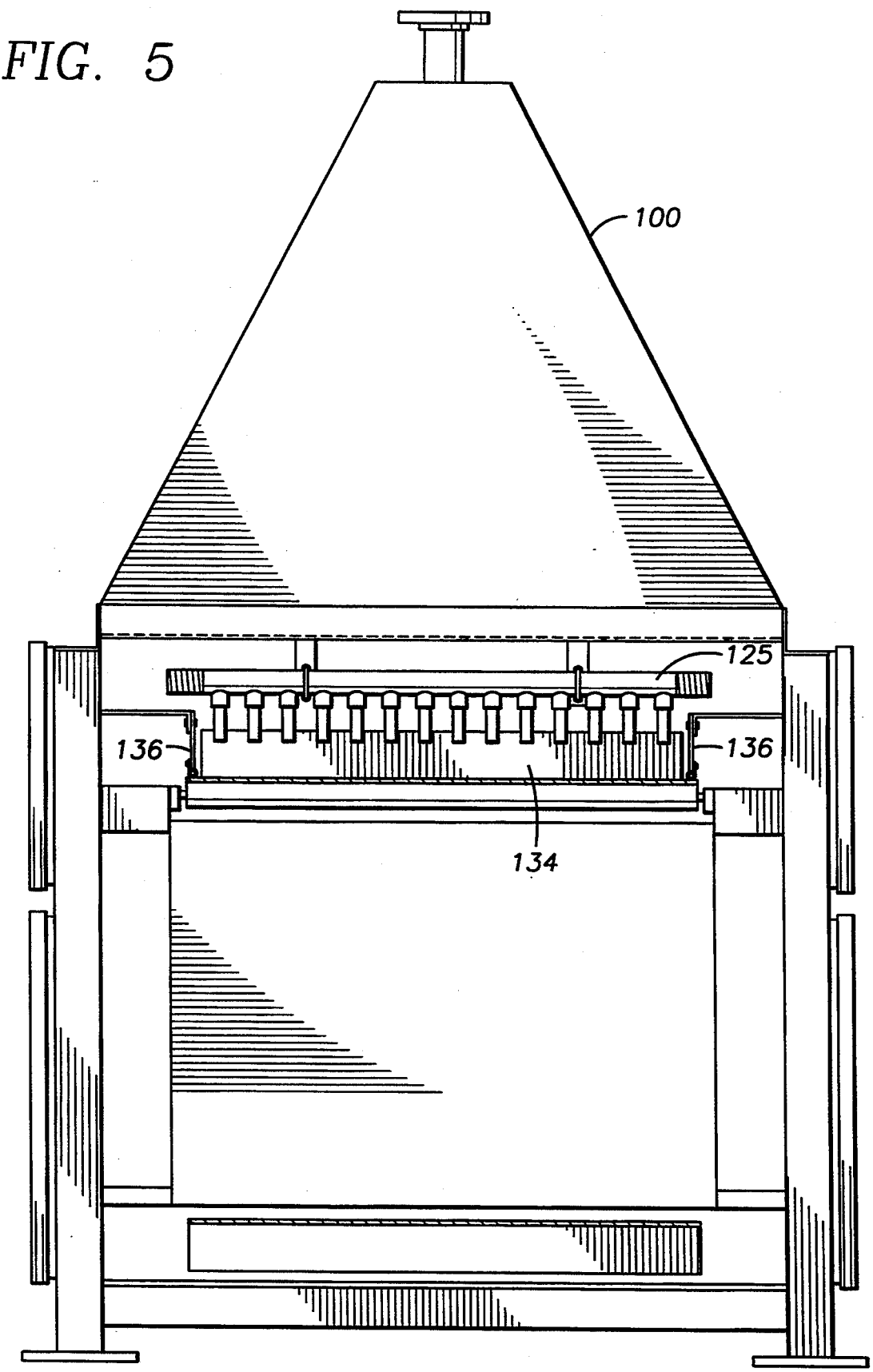
FIG. 5 is a vertical cross-sectional view of the apparatus shown in FIG. 4, taken at line 5—5 of FIG. 4.
Figure 6:
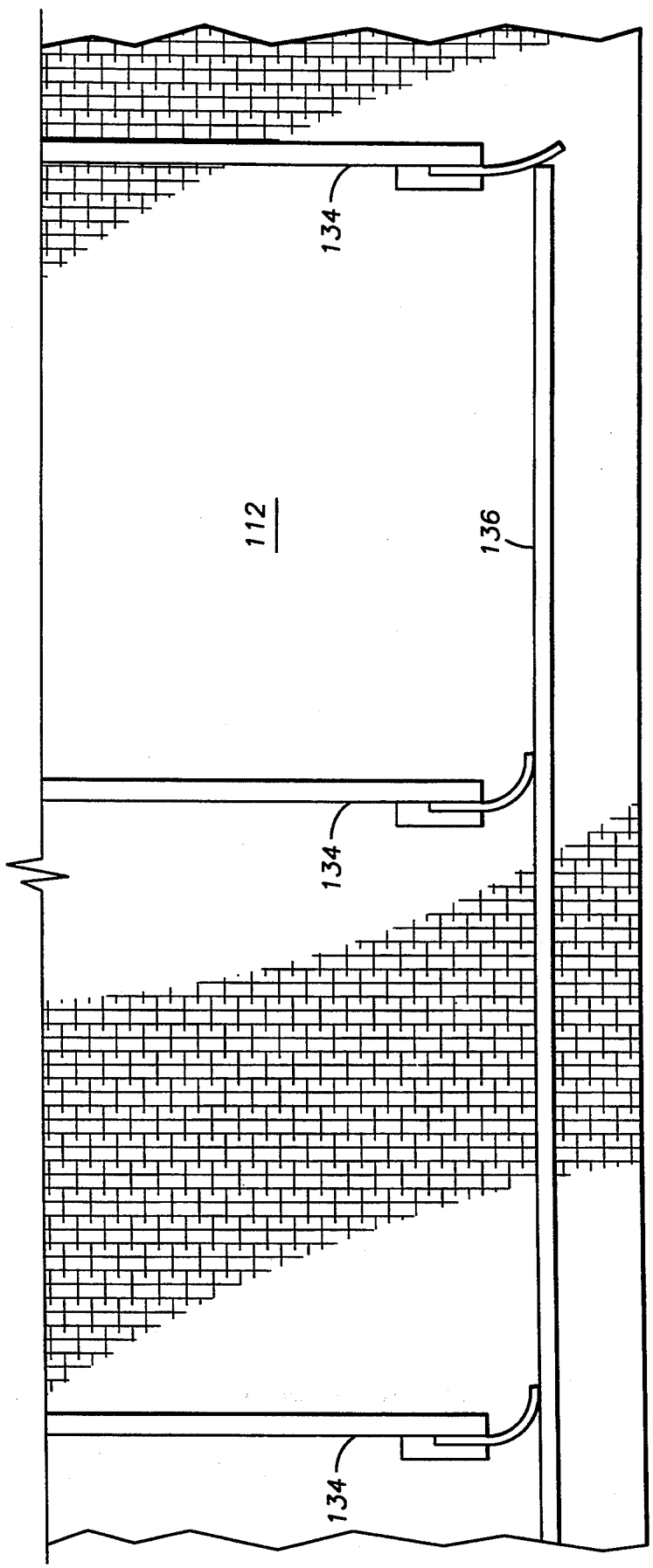
FIG. 6 is a fragmentary plan view of a portion of the apparatus of FIG. 4, taken at line 6—6 of FIG. 4.
Figure 7:
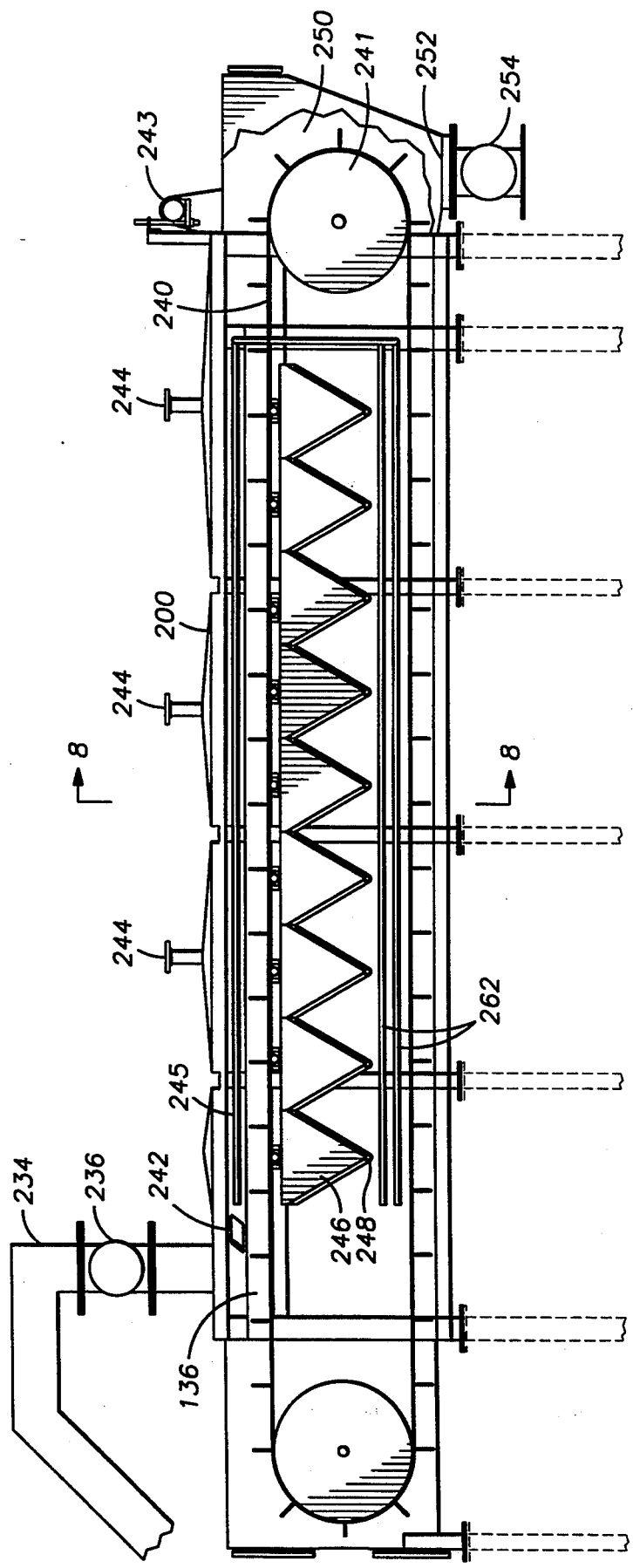
FIG. 7 is a vertical longitudinal sectional view of the second stage of the embodiment of the oil extraction apparatus shown in FIG. 2.
Figure 8:
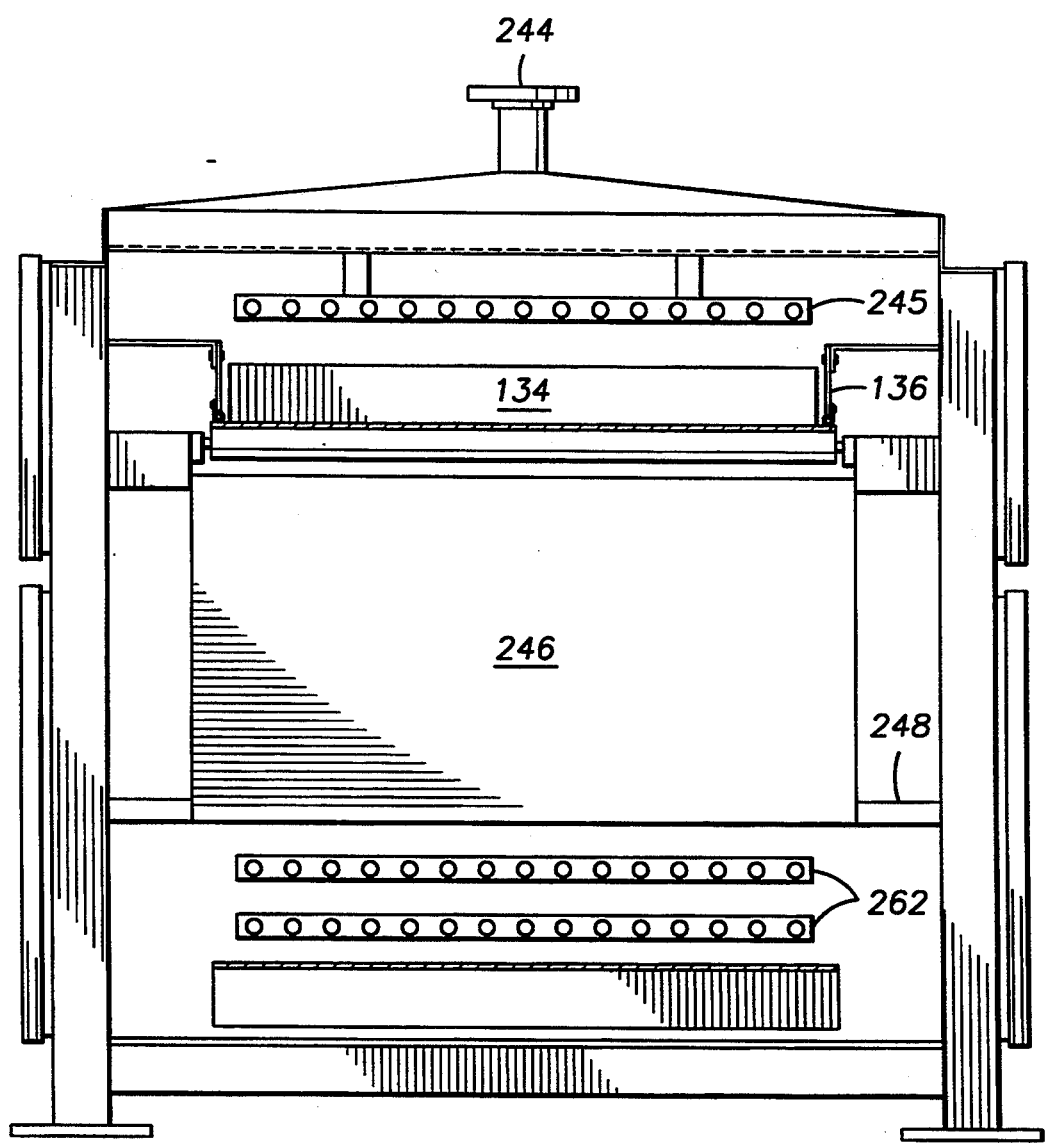
FIG. 8 is a vertical cross-sectional view of the apparatus shown in FIG. 7, taken at line 8—8 of FIG. 7.

The depth of the bed is maintained by the rate of flow of the vegetable matter onto the belt, by the plow 111, and by upstanding transverse ribs 134 substantially spaced along the length of the belt 112 and side walls 136 engaging each longitudinal side of the belt from the feed inlet 108 to the space over the hopper 126. The ribs and side walls are more clearly shown in FIGS. 5 and 6.

Figure 3:
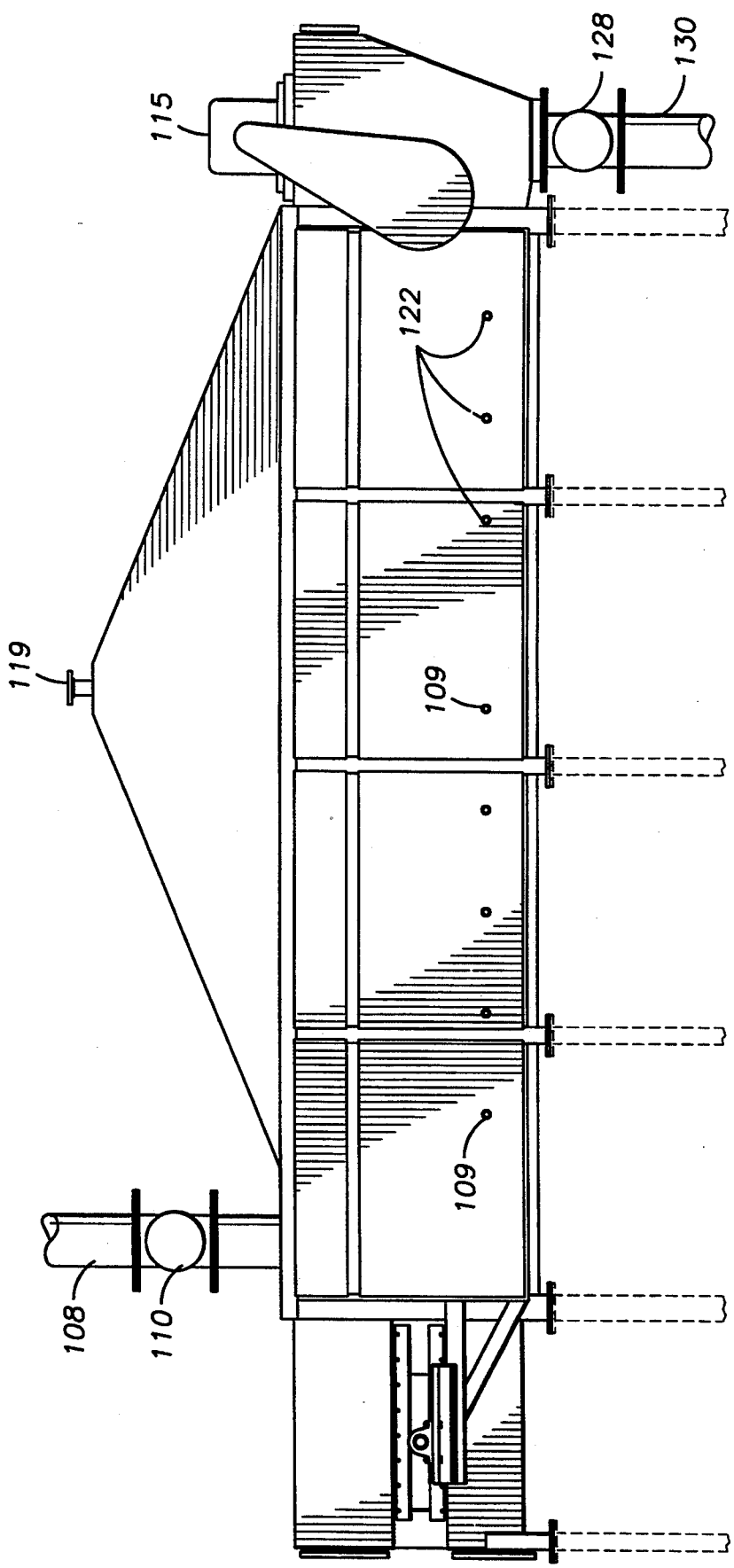
FIG. 3 is a vertical elevation of the first stage of the embodiment of the oil extraction apparatus shown in FIG. 2.

In the embodiment shown, extraction solvent vapor enters vapor chambers 114, 116, below the porous belt, from vapor inlet pipes 109 (FIG. 3), and flows upwardly through the belt 112 and through the bed of vegetable matter conveyed on the surface of the belt while the belt carries the bed of vegetable matter substantially horizontally to the right, as shown in the drawing. The flow of solvent vapor is assisted by a pressure differential across the bed, which may be produced by the positive pressure at which the solvent vapor is generated, or by a vacuum above the bed created by the flue 119 at the top of the extractor and the condenser, described hereinafter, downstream of the flue, or by a combination of positive pressure below the bed and vacuum above the bed. Alternatively, the solvent vapor can flow downwardly through the bed and the porous belt.

The extraction step is preferably carried out at a relatively low temperature, ranging from about 100° F. to about 210° F. for rice bran, under a partial vacuum which is determined by the amount of vacuum required to cause adequate flow of the vaporized solvent through the bed of vegetable matter. The temperature used in such applications will depend on the boiling point of the solvent at the pressure within the extractor and the upper limit required to avoid degradation of the oil. In some applications of the process, a substantially higher temperature may be used, as when the vapor is superheated to create a substantial pressure for extracting the oil from the vegetable matter.

With the extractor of this invention, working with rice bran, a vacuum above the bed of only a few inches of water, with the solvent vapor below the bed at substantially atmospheric pressure, has been found to be adequate to induce flow of the solvent vapor. Such a vacuum may be created at low cost by the flue and condenser. The lower limit will be established by efficiency in drawing the vaporized solvent through the bed of vegetable matter. Too much differential pressure across the bed of vegetable matter will result in high vapor velocity which will carry vegetable matter, particularly light brans, upwardly into the flue. Suitable temperatures and vacuums can be readily determined by experimentation for each vegetable source.

Solvent vapors contact and penetrate the oil-bearing particles in the bed, the solvent molecules forming a weak bond with the oil molecules so as to separate the oil from the solid material. In some applications, pressure and temperature conditions are such that substantially all the solvent and oil are boiled off and are removed from the bed in vapor form. In such applications, the remaining solid material may be further processed by conventional drying techniques to remove remaining traces of oil and solvent, if desired.

In most applications, however, only a portion of the oil, and most of the solvent, will boil off, and the remaining solvent and extracted oil will form a miscella. The miscella will have a higher boiling point than the solvent, and condensation of solvent in the bed will result in increasing the bed temperature, so that a major part of the vaporized solvent and some of the oil components flow upwardly from the bed and out of the extractor through flue 119.

The miscella will be prevented from draining out through the perforations in the belt by the upwardly moving stream of vaporized solvent. When the bed moves past the end of chamber 116, however, a portion of this miscella will drain from the bed through the porous belt into chambers 118, 120, and thence into miscella outlet pipes 122. In some applications of this invention flow of miscella through the belt may be assisted by pressure differential, such as by the use of a vacuum below the belt. Another portion of the miscella may be suctioned from the bed by suction hoses 124, which extend downwardly into the upper part of the bed. Two transverse rows of suction hoses 124 are provided, as shown in FIG. 4, extending substantially the full width of the belt 112, with the hoses of each row offset with respect to the hoses in the other row, so as to provide substantially complete coverage the full width of the bed. These hoses are connected to collecting pipes 125, which are in turn connected to a vacuum source, such as an aspirator, to suction miscella from the bed.

The remaining miscella, with the oil-depleted marc, is carried over the drive pulley 113 and is dropped into an end hopper 126. From here the marc/miscella mixture flows downwardly through an air lock 128 into an outlet pipe 130.

From the outlet pipe 130, the marc/miscella mixture is carried upwardly by a conveyor 132, which may be an auger type conveyor, to the inlet pipe 234 of the oil removal apparatus 200 (FIG. 2), which is a pressure-tight vessel. The mixture then flows through an air lock 236 and onto a moving porous belt 240, which may have a porosity similar to belt 112. Ribs 134 and side walls 136 like those on belt 112 may also be used. The belt is driven by a drive pulley 241, in turn driven by a motor 243, and moves substantially horizontally to the right. The miscella/marc mixture is spread to a substantially uniform depth on the belt by a spreader plow 242. The depth of the bed in the oil separator may be greater than the bed depth in the extractor, without sacrificing efficiency. For rice bran, a bed depth of 7 inches works well, and the preferred depth is 6 to 8 inches. Bed depths as low as 4 inches or as high as 10 inches may be used with a sacrifice in efficiency.

The miscella of liquid solvent/extracted oil which is carried with the marc is separated from the marc by blowing a gas through the porous belt at high velocity caused by a pressure differential across the belt, using a partial vacuum supplied beneath the porous conveyor belt or pressure above the belt, or both. The gas, either air or an inert gas such as nitrogen, is introduced to the upper portion of oil removal apparatus 200 through gas intake means 244. An inert gas is used when the presence of oxygen would alter the oil product obtained or create a risk of fire or explosion. The gas moves downwardly through the bed to chambers 246 below the bed. A partial vacuum may be induced by a vacuum pump (not shown) through conduits 248.

Because of the pressure differential across the bed, the gas expands as it passes through the bed, and some of the solvent evaporates. The expansion and the absorption of the heat of vaporization cools the bed and the extracted liquid substantially. In order to keep the bed temperature high enough to prevent possible formation of ice which would block the bed, finned heat exchanger tubes 260, carrying hot water, are placed in the space above the belt 240 to heat the incoming gas. The return tubes 262 are in the lower part of the oil separator, below the bed, and are subjected to a quite frigid atmosphere due to the chilled bed above them and the chilled gas and liquid miscella in the chambers 246. As a result, the water in the finned tubes 262 is chilled for further use in heat exchangers in the process.

The amount of pressure differential required will vary depending upon the flow rate and the particular solvent and vegetable matter being processed. For rice bran, with the incoming gas at atmospheric pressure, a vacuum as low as about three inches of mercury gauge has been found sufficient to vaporize enough solvent to provide substantial cooling and to assist in forcing substantially all of the remaining miscella from the bed. It is more expensive to attain higher vacuums, but in some applications a vacuum as high as 27 inches of mercury gauge will be found to be desirable. Minimal experimentation will be required to determine the most effective pressure differential for particular materials.

The oil-depleted marc is carried by the belt over the drive pulley 241 and into the end hopper 250, which deposits it into the outlet 252. An air lock 254 is provided at outlet 252. From the air lock, the marc may by transferred to a stripping device to remove remaining solvent. Typically residual solvent is removed from the marc using a rotary drum dryer operated at a low temperature, preferably under the assist of a partial vacuum, which enables solvent removal at a lower temperature. Other residual solvent removal procedures which may at times be preferable include centrifuging, permitting the marc to stand so that gravity separation occurs, suctioning the solvent from the marc surface using a vacuum, passing heated air or nitrogen through the oil/solvent composition and combinations of such techniques. Such solvent removal processes are well known within the food processing industry.

Figure 1:
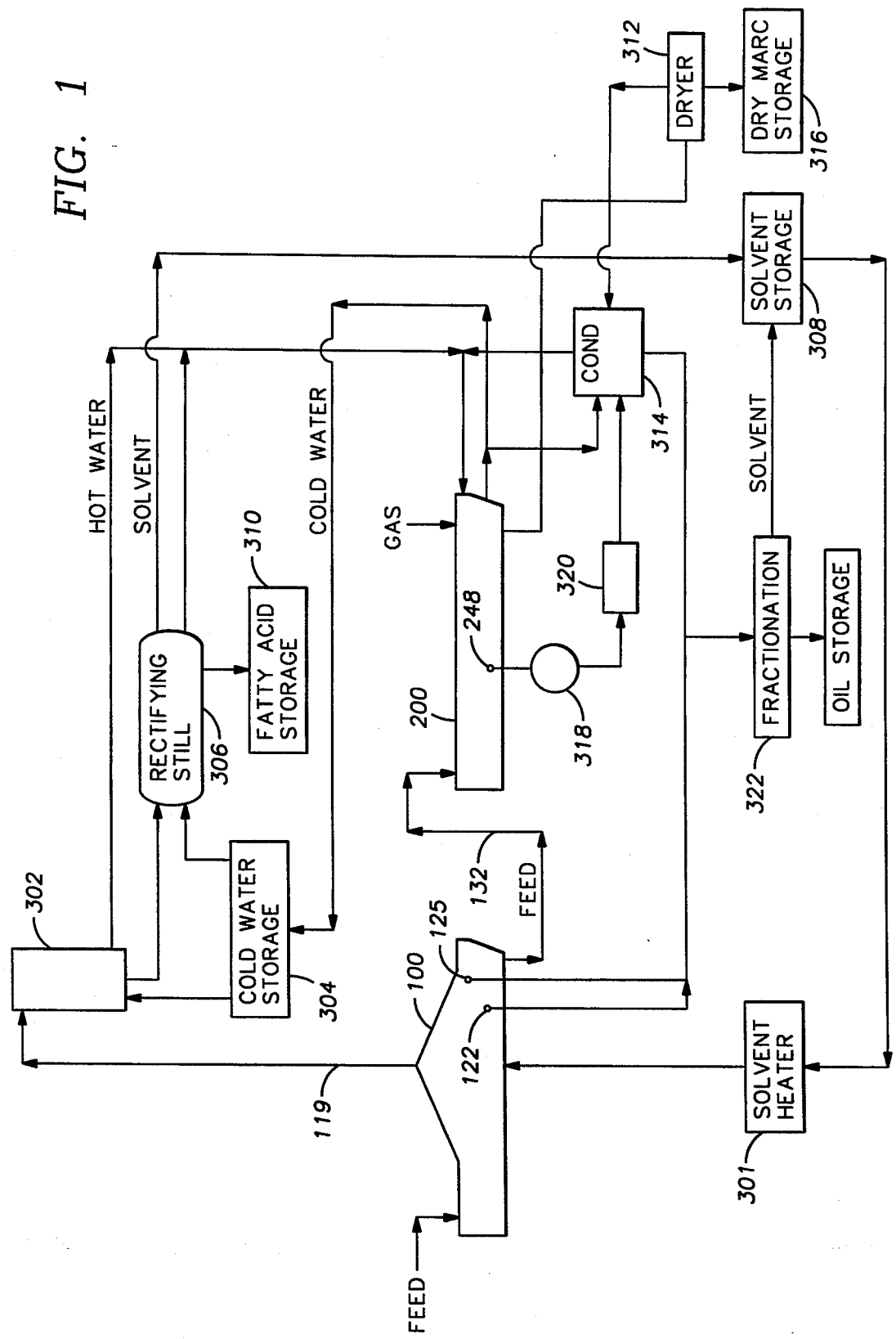
FIG. 1 shows a preferred embodiment of a flow diagram of the method and system of this invention.

FIG. 1 illustrates a system for performing the process of this invention. In this system the vapor contact extractor 100 and the oil removal apparatus 200 are connected by the conveyor illustrated by line 132. Solvent is heated in the heater 301 to a temperature sufficient to vaporize it at the pressure in the solvent heater, about 175° F. to 178° F. for ethyl acetate, which boils at 171° F. at atmospheric pressure, and vaporized solvent flows into the extractor and up through the bed of vegetable matter. Vapor at about 182° F. exits upwardly from the bed, including solvent and oil components, and is carried by flue 119 to a tube and shell condenser 302, in which the vapors are condensed by heat exchange with cold water from cold water storage tank 304. This condensation increases the vacuum in flue 119 which, together with the pressure created below the bed by the solvent heater, constitutes the pressure differential for carrying the solvent vapor up through the bed of vegetable matter in the vapor contact extractor 100. Other means for creating a suitable pressure differential, such as a fan, blower, boiler or vacuum pump may also be used, although at a greater cost.

Liquid condensed in the condenser 302 flows to rectifying still 306, which is provided with cooling water from cold water storage tank 304. In the still, solvent is separated from fatty acids and other oil components. The solvent is transferred to solvent storage container 308 and the fatty acids are transferred to fatty acid storage container 310, or to apparatus for separating various products, as disclosed in our previously identified patent applications.

The marc which exits from oil separator 200 through outlet 252 is conveyed to a dryer 312, from which oil and solvent are transferred to a condenser 314, and dried marc is transferred to storage container 316.

Miscella from conduit 248 is carried by a vacuum pump 318 to a container 320, where liquid and vapor are separated. The vapor flows to condenser 314, and the liquid flows to fractionator 322. Miscella from conduits 122 and 125 and from condenser 314 also flows to the fractionator, where solvent is separated from oil, with the oil flowing to oil storage 324 and the solvent flowing to solvent storage container 308. Alternatively, separation can be achieved by the method described in our previously identified patent applications.

The oil is extracted from the vegetable feed materials using a vaporized solvent for the oils contained therein, which vaporized solvent is not a solvent for the protein in the feed material. In one embodiment of the invention, conventional liquid solvents, such as liquid hexane, are used. The preferred vaporized solvents for most applications are, however, those which can be vaporized at near atmospheric pressure at a temperature which will not adversely affect the products of the oil extraction, particularly those which are capable of forming a weak chemical bond or association with the oil to be extracted from the feed material. It appears that such chemical bonding or association permits the solvent molecule and the oil molecule to act as one unit for purposes of removing the oil from the feed material, thereby providing a more efficient extraction, and that because of the weak bond, the solvent can be subsequently separated from the oil using distillation techniques which provide sufficient energy available for breaking the weak chemical bond or association. Regardless of the specific mechanism, however, the types of solvent described herein will result in substantially complete removal of oil from the vegetable matter in many applications of the invention.

The preferred solvent for this process is an acetate such as, for example, methyl acetate or ethyl acetate, although other solvents such as alcohols or other organic solvents capable of forming weak chemical bonds can be used. The preferred solvents are food grade solvents, such as ethyl acetate, methanol, ethanol, isopropyl alcohol, hexyl alcohol, heptyl alcohol, or dectyl alcohol, either alone or in various combinations. Solvents having 6 or fewer carbon atoms are preferred, particularly when the extracted marc is to be used as a food product, since higher carbon solvents tend to leave an unpleasant taste in the marc. One skilled in the art can, with minimum experimentation, determine which solvent is optimum for use in combination with a particular vegetable material. Applicants have determined that ethyl acetate works particularly well with rice bran, for example.

The contacting of prepared vegetable matter with a volatilized extraction solvent is carried out at a volumetric ratio of solvent to vegetable matter which depends on the solubility of the particular oil to the solvent used, and the percentage of oil in the vegetable matter. In extraction of rice bran, a volumetric ratio of solvent to bran ranging from about 3:1 to about 10:1, and preferably at a volumetric ratio of solvent to bran ranging from about 6:1 to about 8:1, can be used. The contacting is carried out in a manner such that the amount of solvent utilized to extract the oil from the vegetable matter ranges from about 0.7:1 to about 5:1 on a weight of solvent to weight of vegetable matter basis. Most of the solvent will pass through the bed and go to the condenser. Desirably, the process should be controlled so as to minimize the proportion of solvent remaining in the miscella, consistent with obtaining an efficient extraction of oil. With rice oil, a miscella having a solvent/oil ratio of 1:1 or less by weight has been found to give good results.

In the processing of vegetable matter according to this invention, in many cases it will be desirable to extract substantially all of the oil. However, the amount of oil to be extracted from particular vegetable matter depends on the products to be produced. In the extraction of oil from cooked potato chips, it has been found that about 40% of the oil can be extracted by the process and apparatus of this invention. If the extracted vegetable matter, marc, is subsequently processed into food and feed products, in some cases it may be desirable to leave a particular minimum oil content in the marc. Applicants have easily reduced the oil content of rice bran from about 20 percent by weight to less than 1 percent by weight in a laboratory apparatus. The amount of oil extracted depends on the contact time between the vegetable matter surface and the solvent vapor, the concentration of oil in the vapor which is in contact with the vegetable matter surface (overall volume of vapor per volume of vegetable matter used during the stripping operation), the temperature, and the pressure during the solvent extraction operation. Minimal experimentation will establish the most efficient conditions of operation.

Rice bran was processed in the laboratory with ethyl acetate solvent vapor at about 177° F. for a contact time (residence time in a stripping apparatus) ranging from about 30 seconds to about one minute, at a pressure ranging from atmospheric to about 3 in. Hg gauge vacuum, with a weight ratio of solvent to rice bran of approximately 3 to 1. The rice bran oil content of the vegetable matter was reduced from about 21 percent by weight to about 1 percent by weight.

It has been determined that good results are obtained when processing rice bran with ethyl acetate vapor using an 80 mesh porous polyethylene conveyor belt in the extractor which is about 21 feet long and four feet wide, with the belt moving at a speed that the rice bran traverses the length of the extractor in about four minutes. During about ¾ of this distance, the solvent vapor is flowing upwardly through the rice bran, so the extraction step took about three minutes. However, extraction begins to occur as soon as the bed temperature reaches the boiling point of the solvent, and it has been found that the major portion of the extraction of rice oil with ethyl acetate occurs within the first minute.

Conventional temperature and flow controls may be used to insure that optimum temperatures, pressures and flow rates are maintained at all stages of the process.

The critical features of the process of this invention are: 1) that the vegetable matter provide sufficient extraction surface from which the oil can be removed; 2) that the proper solvent be used and that at least the initial contact between vegetable matter and solvent be made with the solvent in vapor form; 3) that the temperature during the solvent extraction be maintained as low as possible (typically less than 210° F.) to avoid degradation of the oils and proteins within the vegetable matter; 4) that a sufficient amount of solvent be used so that the concentration of oil in the extraction solvent vapors at the vegetable matter surface is low enough to have a driving force for migration of the oil from the vegetable matter into the solvent vapor; and, 5) that in view of these factors, the contact time between the solvent vapors and the vegetable matter be sufficient to permit the desired amount of extraction of oil from the vegetable matter.

The apparatus depicted in FIGS. 2 to 8 of the drawing is also useful in solvent extraction of oil by liquid solvents, such as the conventional hexane, with only minor changes. Instead of flowing a solvent in vapor form upwardly through the bed of vegetable matter, the liquid solvent may be sprayed downwardly onto the vegetable matter. The solvent and oil-wet marc produced on the moving belt in the extractor 100 may then be conveyed to the oil separator 200 and processed in the same way as the marc produced by the vaporized solvent.

Temperatures and pressures discussed in the foregoing description are by way of example only, and are not intended to be limiting. Various temperatures and pressures may be found to be desirable, depending upon the particular vegetable matter being processed, and other conditions of operation. For example, in the processing of chips and other cooked foods to reduce the content of oil absorbed during cooking, higher temperatures and/or greater pressure differential may be used to carry the oil out of the extraction bed with the vaporized solvent, so that no liquid miscella remains in the bed. Such higher temperatures and/or greater pressure differentials are also useful for oil extraction from other vegetable matter. For other materials and solvents, higher or lower vacuums may be desirable, or it may be desirable to operate with a pressurized system rather than with a vacuum. Higher pressure differentials, and higher pressures or greater vacuums, are achieved, however, only at a greater cost for equipment and operating expense, and this cost must be balanced against the cost of separating the liquid miscella from the marc as described herein.

Although preferred embodiments of the invention have been shown and described herein, many variations thereof will be suggested by this description to those skilled in the art. For example, vapor flow through the bed in the extractor may be downward instead of upward, so that the flow of vapor assists in driving miscella through the porous belt. Accordingly, the invention is not limited to these specific embodiments, but extends to all variations which may be included within the scope of the appended claims, and equivalents thereof.

We claim:

1. Apparatus for use in extracting oil from vegetable matter, comprising
    a horizontally extending container having an inlet end and an outlet end,
    a horizontally extending porous endless belt in said container,
    drive means for continuously moving said belt from near the inlet end of the container to near the outlet end,
    a feed inlet near the inlet end of the container, positioned for the deposit of vegetable matter feed on the belt near the inlet end, to create a continuously moving bed of vegetable material on the belt,
    a solvent inlet positioned to allow solvent to flow through said bed and said belt to extract oil from said vegetable matter,
    a plow suspended above the belt between the feed inlet and the solvent inlet to spread and control the depth of the vegetable matter on the belt,
    an outlet from said container for the vegetable matter from which the oil has been extracted,
    an outlet from said container for extracted oil and solvent,
    a second horizontally extending pressure-tight container having an inlet end and an outlet end,
    a second horizontally extending porous endless belt in said second container,
    drive means for continuously moving said second belt from near the inlet end of the second container to near the outlet end,
    a feed inlet near the inlet end of the second container,
    means connecting the vegetable matter outlet of the first container with the feed inlet of the second container for transferring vegetable matter from the first container to the second container,
    inlet means connected to the feed inlet of the second container positioned for the deposit of vegetable matter feed on the second belt near the inlet end, to create a continuously moving bed of vegetable material on the second belt,
    means for causing a gas to flow through said bed and said second belt to drive oil and solvent from said vegetable matter,
    an outlet from said second container for the vegetable matter from which the oil and solvent has been removed, and
    an outlet from said second container for removed oil and solvent.

2. Apparatus as defined by claim 1 and including heat exchange means in said second container to impart heat to said second container.

3. Apparatus as defined by claim 2 wherein said heat exchange means includes means for conducting a heat exchange fluid first through the space in the container above the belt and then through the space in the container below the belt.

4. Apparatus for use in extracting oil from vegetable matter, comprising
    a horizontally extending container having an inlet end and an outlet end,
    a horizontally extending porous endless belt in said container,
    drive means for continuously moving said belt from near the inlet end of the container to near the outlet end,
    a feed inlet near the inlet end of the container, positioned for the deposit of vegetable matter feed on the belt near the inlet end, to create a continuously moving bed of vegetable material on the belt,
    a solvent inlet positioned to allow solvent to flow through said bed and said belt to extract oil from said vegetable matter,
    an outlet from said container for the vegetable matter from which the oil has been extracted, an outlet from said container for extracted oil and solvent, means providing communication between a vaporized solvent source and one side of said belt, and means in communication with said container on the other side of the belt for removing vapor from said container, said latter means comprising a flue and a condenser in communication with said flue.

5. Apparatus for use in extracting oil from vegetable matter, comprising a horizontally extending container having an inlet end and an outlet end, a horizontally extending porous endless belt in said container, drive means for continuously moving said belt from near the inlet end of the container to near the outlet end, a feed inlet near the inlet end of the container, positioned for the deposit of vegetable matter feed on the belt near the inlet end, to create a continuously moving bed of vegetable material on the belt, a solvent inlet positioned to allow solvent to flow through said bed and said belt to extract oil from said vegetable matter, an outlet from said container for the vegetable matter from which the oil has been extracted, an outlet from said container for extracted oil and solvent, means providing communication between a vaporized solvent source and one side of said belt, means in communication with said container on the other side of the belt for removing vapor from said container, a chamber below said belt connected to receive vaporized solvent from said communication means said chamber being positioned to distribute vaporized solvent to a portion of the length of the bed of vegetable matter on the belt, and means in said container positioned to receive liquid which drains from another portion of the length of the bed.

* * * * *